(12) United States Patent
Jaczynski

(10) Patent No.: US 7,763,717 B1
(45) Date of Patent: Jul. 27, 2010

(54) CONTINUOUS PROTEIN AND LIPID RECOVERY FROM FOOD ANIMAL PROCESSING BYPRODUCTS

(75) Inventor: Jacek Jaczynski, Morgantown, WV (US)

(73) Assignee: West Virginia University Research Corp. of West Virginia University, Morgantown, WV (US)

( * ) Notice: Subject to any disclaimer, the term of this patent is extended or adjusted under 35 U.S.C. 154(b) by 93 days.

(21) Appl. No.: 11/369,331

(22) Filed: Mar. 7, 2006

Related U.S. Application Data

(60) Provisional application No. 60/659,685, filed on Mar. 8, 2005.

(51) Int. Cl.
*A23J 3/00* (2006.01)
*A61K 38/00* (2006.01)

(52) U.S. Cl. .................. 530/412; 530/355; 530/205; 426/652

(58) Field of Classification Search .......... None
See application file for complete search history.

(56) References Cited

U.S. PATENT DOCUMENTS

| | | | |
|---|---|---|---|
| 5,171,592 A * | 12/1992 | Holtzapple et al. | 426/69 |
| 5,372,723 A * | 12/1994 | de Geus et al. | 210/639 |
| 5,384,149 A * | 1/1995 | Lin | 426/646 |
| 6,005,073 A | 12/1999 | Hultin et al. | |
| 6,136,959 A | 10/2000 | Hultin et al. | |
| 6,288,216 B1 | 9/2001 | Hultin et al. | |
| 6,451,975 B1 * | 9/2002 | Hultin et al. | 530/350 |
| 6,887,508 B2 * | 5/2005 | Huang | 426/573 |
| 7,001,634 B2 * | 2/2006 | Browne | 426/329 |
| 2003/0124239 A1 | 7/2003 | Kelleher | |
| 2004/0067551 A1 | 4/2004 | Hultin et al. | |
| 2005/0233060 A1 | 10/2005 | Kelleher | |

OTHER PUBLICATIONS

Study, I. M. (1999) Protein Denaturation in Foam, J. Colloid Interface Sci., vol. 215, No. 2, pp. 323-332.*
Mleko et al. (1997) Interactions of kappa -carrageenan with whey proteins in gels formed at different pH, Food Res. International, vol. 30, No. 6, pp. 427-433.*
Miroevskii et al. (20040 A homogenizer—A new type of pulverizer, Chem. Petroleum Eng., vol. 40, Nos. 11-12, pp. 651-654.*
Baldwin et al. (1972) Fat system for brakery products, J. Am. Oil Chem. Soc. (1972) 49, 473-477.*

* cited by examiner

*Primary Examiner*—Anand U Desai
*Assistant Examiner*—Samuel Liu
(74) *Attorney, Agent, or Firm*—Mary-Jacq Holroyd; Johnston Holroyd

(57) ABSTRACT

A process and system for recovering protein and lipid from food animal byproducts, and the products thereof, involves homogenizing animal byproducts with water to form a homogenate, solubilizing the homogenate by adjusting the pH of the homogenate to form a first pH adjusted composition, separating the first pH adjusted composition forming a light fraction containing lipids (oil), a medium fraction containing protein in solution, and a heavy fraction containing fat-free impurities, separation by first centrifugation, adjusting the pH of the medium fraction to about the isoelectric point of the proteins thereby precipitating the medium fraction forming a second pH adjusted composition, and separating the second pH adjusted composition forming a light fraction containing water and a heavy fraction containing precipitated proteins. The water may then be recycled and used in the homogenization of further byproducts.

32 Claims, 10 Drawing Sheets

|  | KRAMER SHEAR (G/G) | PUNCH (G) | HARDNESS (G) | SPRINGINESS | COHESIVENESS | GUMINESS | CHEWINESS |
|---|---|---|---|---|---|---|---|
| POLLACK SURIMI GELS | 96.13 | 236.67 | 1758.87 | 0.88 | 0.66 | 1159.26 | 1018.45 |
| TROUT PROTEIN GELS | 165.49 | 301.20 | 2999.22 | 0.83 | 0.64 | 1907.75 | 1583.15 |

Fig. 12

|  | L* | A* | B* |
|---|---|---|---|
| POLLACK SURIMI GELS | 78.69 | -3.07 | 2.52 |
| TROUT PROTEIN GELS | 79.47 | -1.79 | 10.51 |

Fig. 13

|  | % ASH |
|---|---|
| BONELESS SKINLESS TROUT FILLET | 5.54 |
| TROUT FRAMES (BY PRODUCTS) | 13.91 |
| RECOVERED FAT-FREE IMPURITIES | 41.10 |

| PROTEINS SOLUBILIZED AT | % ASH |
|---|---|
| 2.5 | 2.14 |
| 3.0 | 1.61 |
| 12.0 | 0.88 |
| 12.5 | 1.37 |
| 13.0 | 2.14 |

|  | % ASH |
|---|---|
| KRILL TAIL MEAT | 11.09 |
| WHOLE KRILL | 17.36 |

| PROTEINS SOLUBILIZED AT | % ASH |
|---|---|
| 2.0 | 5.98 |
| 2.5 | 4.32 |
| 3.0 | 4.01 |
| 12.0 | 4.88 |
| 12.5 | 5.71 |
| 13.0 | 5.74 |

Fig. 14

ESSENTIAL AMINO ACIDS

| | | THR | VAL | MET | ILE | LEU | PHE | HIS | LYS | TRP | TOTAL | AVERAGE |
|---|---|---|---|---|---|---|---|---|---|---|---|---|
| | TROUT FRAMES | 1.8 | 2.2 | 1.4 | 1.8 | 3.1 | 1.6 | 1.2 | 3.5 | 0.5 | 17.2 | 17.2 |
| TROUT PROTEINS SOLUBILIZED AT pH | 2.0 | 3.7 | 4.6 | 2.6 | 3.9 | 6.6 | 3.4 | 2.1 | 7.4 | 1.0 | 35.3 | |
| | 2.5 | 3.4 | 4.3 | 2.2 | 3.6 | 6.0 | 3.1 | 1.9 | 6.7 | 0.9 | 32.3 | 34.3 |
| | 3.0 | 3.7 | 4.7 | 2.6 | 4.0 | 6.6 | 3.4 | 2.1 | 7.3 | 0.9 | 35.2 | |
| | 12.0 | 3.8 | 5.0 | 2.6 | 4.2 | 6.9 | 3.5 | 2.3 | 7.6 | 1.1 | 37.2 | |
| | 12.5 | 3.9 | 4.9 | 2.6 | 4.1 | 6.9 | 3.5 | 2.2 | 7.6 | 1.1 | 36.9 | 37.4 |
| | 13.0 | 4.1 | 5.1 | 2.6 | 4.3 | 7.1 | 3.7 | 2.3 | 7.8 | 1.2 | 38.2 | |
| | WHOLE KRILL | 2.2 | 2.6 | 1.5 | 2.5 | 4.0 | 2.2 | 1.1 | 4.4 | 0.7 | 21.2 | 21.2 |
| KRILL PROTEINS SOLUBILIZED AT pH | 2.0 | 4.8 | 6.0 | 2.9 | 5.5 | 9.0 | 5.0 | 2.6 | 9.2 | 1.5 | 46.6 | |
| | 2.5 | 4.5 | 5.8 | 3.2 | 5.7 | 8.9 | 4.9 | 2.5 | 9.2 | 1.6 | 46.3 | 47.0 |
| | 3.0 | 4.8 | 5.9 | 3.3 | 5.9 | 9.2 | 5.2 | 2.6 | 9.6 | 1.6 | 48.1 | |
| | 12.0 | 4.6 | 5.8 | 3.4 | 5.7 | 8.8 | 5.1 | 2.7 | 9.2 | 1.7 | 47.0 | |
| | 12.5 | 4.5 | 5.6 | 3.2 | 5.5 | 8.6 | 5.0 | 2.5 | 8.9 | 1.5 | 45.3 | 45.5 |
| | 13.0 | 4.4 | 5.5 | 3.1 | 5.5 | 8.4 | 4.8 | 2.5 | 8.7 | 1.5 | 44.3 | |
| | SOYBEAN | 3.9 | 4.6 | 1.1 | 4.6 | 7.8 | 5.0 | 2.6 | 6.4 | 1.4 | 37.4 | 37.4 |
| | FNB | 3.5 | 4.8 | 2.6 | 4.2 | 7.0 | 7.3 | 1.7 | 5.1 | 1.1 | 37.3 | 37.3 |

Fig. 15

CONTINUOUS PROTEIN AND LIPID RECOVERY FROM FOOD ANIMAL PROCESSING BYPRODUCTS

RELATED APPLICATIONS

This application claims the benefit of U.S. Provisional Application Ser. No. 60/659,685 entitled "Continuous Protein and Lipid Recovery From Food Animal Processing Byproducts" filed on 8 Mar. 2005, the contents of which are incorporated herein by reference in its entirety.

BACKGROUND OF THE INVENTION

Filleting fish requires removal of byproducts such as bones, skin, fin, scales, viscera and head. Most processors fillet fish by mechanical means. Mechanical filleting of one hundred pounds of trout (*Oncorhynchus mykiss*) yields approximately forty pounds of fillets and sixty pounds of byproducts. The byproducts contain approximately twenty pounds of meat, which is half the amount of the fillets, and five pounds of fish oils (lipids). The byproducts are primarily land-filled, or ground and discarded. In descriptive terms, per two truckloads of trout fillets going to the market, one truckload of trout meat and a quarter of a truckload of trout lipids, which are not recovered from the byproducts, are land-filled, or ground and discarded.

Historically fish byproducts have not been fully utilized by the rendering industry due to the "fishy odor" caused by auto-oxidation of fish oil. The odor is transferred to the meat of animals fed excessive amount of fish in their diets, resulting in lower meat quality, and thus, limited consumer acceptance. Free radicals, normally generated during the auto-oxidation, further deteriorate other components of animal feeds such as proteins, vitamins and the like. Fish processors incur expenditures to remove processing byproducts from their facilities. These byproducts are also a significant environmental bio-burden.

Mechanical filleting of other fish species yields even less fillets and more byproducts. Mechanical filleting of one hundred pounds of tilapia (*Oreochromis niloticus*) yields approximately thirty pounds of fillets and seventy pounds of byproducts, resulting in even higher amounts of fish meat and oil being disposed of on per fish basis. Species such as Atlantic menhaden (*Brevoortia tyrannus*) are regarded as low-value species due to high amounts and distribution of bone, and high concentration of lipids. Fish species that have characteristics similar to menhaden are underutilized, or not utilized, for human consumption due to the unavailability of a proper meat recovery technology that can efficiently eliminate the bones and lipids from the fillets.

Antarctic krill (*Euphausia superba*) are small, shrimp-like crustaceans in the seas with the largest biomass of any multicellular animal species on earth. Estimates state that one hundred fifty million metric tons of krill could be an annual sustainable harvest compared with one hundred million metric tons of the total global seafood human consumption. Small krill size and endogenous proteases are processing challenges, however, which have resulted in the failure of commercial krill fisheries for human consumption. According to the Food and Agricultural Organization (FAO), Atlantic and Pacific fish stocks have been exceeding the maximum sustainable levels since 1980 and 1999, respectively. Current commercial catch results in over-fishing and should be lowered to approximately eighty million metric tons. Utilization of fish meat and lipids recovered from fish filleting byproducts, krill, and species such as menhaden for human consumption would partially alleviate the environmental stress on the current marine environment.

The growth of the aquaculture industry encourages the development of technologies that recover proteins and lipids from filleting byproducts, and increases the total return. Existing surimi technology could be a good alternative for recovery of functional proteins; however, the traditional surimi processing cannot recover proteins from the byproducts and uses excessively large volumes of water. Surimi is de-boned and skinned fish; the fillets are minced, washed and finally strained to form a concentrated fish paste.

Surimi is an ancient process to make a protein food predominantly derived from fish. Water is used in the process for making surimi, and can be used in a ration from about two parts water to one part fish up to about five parts water per one part fish; typically, three parts water is used per one part fish. Two to five washes are used. Twenty to thirty percent of the fish muscle proteins are solubilized when the ground muscle is washed with water. These soluble proteins, known as sarcoplasmic proteins, are generally not recovered from the wash water of the surimi process. These solubilized proteins are a good source of protein for animal or human feedstock. Only minced proteins, typically fish muscle proteins, are used in the surimi. The resultant washed minced protein product, in solid form, is then processed further to make protein gels. Kamboko is a popular fish sausage, produced by the surimi process, in which the washed minced fish is heated until it gels. High quality surimi is generally only produced from lean white fish. About fifty to sixty percent of the total protein of the muscle tissue is lost with dark-fleshed fish sources.

Newer methods have been derived in an effort to extract edible protein from muscle sources. U.S. Pat. Nos. 6,005,073 ('073) and 6,288,216 ('216) issued to Hultin et al., on Feb. 12, 1997 and on Sep. 11, 2001 respectively, disclose a process for isolating a protein composition from a muscle source and protein composition by mixing a particulate form of the muscle with an acidic aqueous liquid having a pH below about pH 3.5 to produce a protein rich solution. A protein rich aqueous solution is separated from solids and lipids, including membrane lipids. The protein rich aqueous solution can be treated to effect protein precipitation, followed by protein recovery. Furthermore, the inventions, of the '073 and '216 patents, require frequent water replacement. The particulate form of muscle is pre-prepared from muscle that has already been separated from most bone and other byproducts.

U.S. Pat. No. 6,451,975 ('975) also issued to Hultin et al. on Sep. 17, 2002 discloses a protein composition and process for isolating a protein composition from a muscle source by mixing a particulate form of the tissue with an acidic aqueous liquid having a pH below about pH 3.5 to produce a protein rich solution substantially free of myofibrils and sarcomere tissue structure. The protein rich aqueous solution can be treated to effect protein precipitation, followed by protein recovery. U.S. Pat. No. 6,136,959 ('959) issued to Hultin et al. on Oct. 24, 2000 describes an alkaline protein extraction process which isolates edible protein from animal muscle by solubilizing the protein in an alkaline aqueous solution. The resultant solution contains 15% or less animal muscle. Again the muscle is pre-prepared from muscle that has already been separated from most bone and other byproducts.

U.S. Patent Application No. 2003/124,239 applied for by Kelleher on Feb. 19, 2003 describes a water soluble peptide composition, also derived from animal muscle tissue proteins. An enzyme is utilized in the process to make the peptide composition, and the resultant peptide composition contains less than about one weight percent fats and oils based upon the weight of the peptide composition and less than about two weight percent ash based on the weight of the peptide composition.

U.S. Patent Application No. 2004/067,551, PCT applied for by Hultin et al. on Sep. 5, 2001, describes a protein extraction process for isolating edible protein from animal muscle by solubilizing the protein in an alkaline aqueous solution. Undesirable components such as bones, neutral lipids, membrane lipids, fatty pieces, skin, cartilage, and other insoluble material are removed and discarded.

U.S. Patent Application No. 2005/233,060 applied for by Kelleher on Sep. 5, 2003 discloses a functional animal muscle protein concentrate composition and process for making the protein concentrate composition. The concentrated aqueous acidic protein solution derived from animal muscle tissue is added to the meat or fish prior to cooking. Similarly, U.S. Pat. No. 6,855,364 issued to Kelleher et al. on Feb. 15, 2005 describes a process for retaining moisture in cooked animal muscle which involves adding a dry protein mixture or an aqueous acidic protein solution derived from animal muscle tissue to meat, including fish, prior to cooking.

All of these processes take advantage of low protein solubility at their isoelectric point. It is well known in the art to use low protein solubility at their isoelectric point to isolate proteins. Furthermore, these processes produce peptides, which are products of a hydrolytic breakdown of proteins.

SUMMARY OF THE INVENTION

The present invention relates to a novel process for recovering lipids and protein from food animal processing byproducts, and is especially useful in the recovery of functional muscle proteins, lipids and processing byproducts from fish. A batch operation and a continuous operation for protein and lipid recovery that allows an efficient recovery of functional muscle proteins and lipids from food animal processing byproducts are included in the present invention.

The batch operation, unlike the continuous operation modes is defined as a cyclic operation that requires repetitive cycles of loading substrate such as fish or fish-processing byproducts, processing involving isoelectric solubilization and precipitation of fish muscle proteins, and unloading the products which may consist of recovered fish muscle proteins and lipids. In contrast to batch operation, continuous operation mode allows continuous feeding of substrate, continuous processing, and continuous harvest of the products. The present continuous operation mode is a useful operation type for the protein and lipid recovery from fish or fish processing byproducts.

Using trout as an example, the protein recovery yield of the present invention is approximately 90% on dry weigh basis. The recovery is based upon isoelectric solubilization and precipitation of trout muscle proteins. The recovered trout muscle proteins retain their functionality, gelation, which is critical in development of restructured value-added food products. The laboratory-developed gels mimic restructured value-added foods and allow scientific determination of texture and color properties, which are two important quality attributes for these foods.

An isoelectric solubilization/precipitation of fish muscle proteins is applied to isolate functional proteins. This technique offers several advantages including high yield, separation of impurities (bones, skin and scales) and a continuous mode of operation, enabling water recycling without treatment. This procedure may bring significant benefits to both the fish industry and environmental protection.

The proteins are solubilized at either acidic (about 2.0 to about 3.5) or basic (about 10.5 to about 13.0) pH, followed by removal of insoluble materials with subsequent protein precipitation at their isoelectric point (pH 5.5), followed by their separation from water. The muscle proteins recovered from trout retain their functionality—gelation, which is critical in development of restructured value-added food products. The omega-3 fatty acids included in the lipids recovered from trout do not exhibit degradation due to the pH treatment during protein and lipid recovery.

Five steps are used to recover muscle protein and lipids, according to the present invention: 1. homogenization that simplifies sample handling and increases surface area of proteins and lipids, and therefore facilitates interaction between proteins and lipids with water; 2. first pH shift (from about pH 2.0 to about pH 3.5, or from about pH 10.5 to about pH 13.0) that results in protein solubilization due to increased electrostatic interaction between proteins and water, and facilitates separation of lipids from water due to increased polarity of the solution; 3. separation by first centrifugation, at about 10,000×g for about 10 minutes at about 4° C. for batch production in the laboratory and at about 3,000 to about 3,500×g for about 2.0 to about 2.5 minutes at about 2° C. to about 9° C. in a continuous centrifuge (decanter) for continuous production, that results in bottom fraction of the fat-free impurities such as, bones, skin, fins, and insolubles, middle fraction of muscle proteins solubilized in water, and top fraction of fish lipids rich in omega-3 fatty acids as confirmed by experimentation; 4. the middle fraction is recovered and subjected to the second pH shift at the proteins' isoelectric point that results in isoelectric precipitation of muscle proteins due to decreased electrostatic interaction between proteins and water and increased hydrophobic interaction between proteins; and 5. separation by second centrifugation, at about 10,000×g for about 10 minutes at about 4° C. for batch production in the laboratory and at about 3,000 to about 3,500×g for about 2.0 to about 2.5 minutes at about 2° C. to about 9° C. in a continuous centrifuge (decanter) for continuous production, that results in separation of precipitated functional muscle proteins from water. The water separated in this step is protein-free and clear and therefore can be recycled in the continuous process. The continuous system for protein and lipid recovery is based on byproduct homogenizer (step one), two bio-reactors (steps two and four) and two continuous centrifuges (steps five and six).

A protein and lipid recovery in a continuous mode according to the present invention uses the same basic five steps: first step, Homogenization; second step, First pH Shift; third step, First Centrifugation; fourth step, Second pH Shift; and fifth step, Second Centrifugation. The homogenization of the fish processing byproducts with water is accomplished by using a continuous meat homogenizer such as for example Stephan Microcut MCH-10. The homogenized slurry is continuously pumped using a peristaltic pump to the first bioreactor such as for example New Brunswick Scientific BioFlo 110 for the first pH adjustment (about pH 2.0 to about pH 3.5 or about pH 10.5 to about pH 13.0). The soluble proteins and lipids are separated from the insolubles using a continuous separator such as for example Alfa Laval MRNX 438 DD decanter. The separated soluble proteins and lipids are pumped to the second bioreactor for the second pH adjustment (pH 5.5) to precipitate the muscle proteins at their isoelectric point. The precipitated proteins are separated from the water and lipids by the second decanter. The separated proteins can be mixed with cryoprotectants and antioxidants if required and frozen for storage or used immediately to develop value-added food products. The water is re-used in the first step (i.e., homogenization). This system can work continuously at a flow rate of 120 L/hr. The flow rate can be modified by scaling-up the equipment.

The protein and lipid recovery technology, according to the present invention, has several apparent and multi-fold aspects including environmental, food production and economical. The present invention is more environmentally responsible. Less waste results from the recycling of water in the continuous mode. Less waste, where fish is the source of the protein, results from the fact that the present invention extracts more protein from the rendered fish than the prior art which extracts the protein solely from large muscles. Less environmental stress associated with the disposal of the processing byproducts and over-fishing of depleted marine stocks results where the present invention is used with fish. Furthermore, the prices of fish products are lower, and a bigger variety of nutritious aquatic food products are possible when the present invention is used with fish as the protein source.

The muscle proteins and lipids can be efficiently recovered from otherwise useless food animal processing byproducts. The byproducts often pose an environmental hazard when disposed of conventionally. The recovered proteins, lipids, and fat-free impurities can be made into human food products, pet food, animal feed, and plant fertilizer.

Animal species not utilized for human consumption at commercial scale yet abundantly available such as Antarctic krill (*Euphausia superba*) and Atlantic menhaden (*Bervoortia tyrannus*) due to the lack of efficient protein and lipid recovery technologies can potentially be used for development of human food products.

The present invention may be used in fish, poultry, and red meat processors, human food product development, nutraceutical industry, pharmaceutical industry, cosmetics industry, dietary supplements industry, animal feed industry, pet food industry and plant fertilizer industry.

An aspect of the present invention is the use of food industry processing byproducts as starting material and not animal muscle. In addition to processing byproducts, the present invention may use animal muscle, krill, fish, poultry, shrimp, and pork as starting materials.

Another aspect of the present invention is that, although byproducts are used as starting material, the resultant proteins are ash-free. In other words, the resultant proteins lack bone, skin, and the like. These proteins are in a form of a viscoelastic paste, and exhibit both viscous and elastic properties when deformed. The proteins may be processed further into gels.

Yet another aspect of the present invention is to recover additional products, namely, oil (lipids) and the fat-free impurities. Similarly to the proteins recovered by the present invention, the lipids do not undergo degradation. The fat-free impurities are a fat-free product which is rich in growth-promoting minerals as well as non-muscle proteins. The fat-free impurities could optionally be isolated for use in animal and pet feeds.

Another aspect of the present invention is that the proteins are separated from water, and the water is recycled in the continuous mode of the present invention. The processing water is a significant issue in the food processing industries. Pollution and wastewater treatment are unfortunate features of the food processing industries. Minimizing the amount of water released into the environment or in need of treatment reduces both cost and environmental impact of the industrial process.

A further aspect of the present invention is the continuous mode aspect, which facilitates a cyclic flow through with substrate fed in and products harvested in a continuous manner unlike a traditional linear batch operation. The resultant system offers protein recovery at ~90% or greater. Furthermore, the continuous system also offers faster processing, and therefore, less protein and lipid degradation occurs than when using conventional technology. The present invention allows processing times of thirty (30) minutes or less. A short processing time, due to increased processing efficiency, limits degradation of the products. The quality, of the resultant recovered proteins and lipids, is increased thereby.

An aspect of the present invention is the separation following protein solubilization produces three distinct phases. The products include protein solution, lipids, and the fat-free impurities. Peptides are not a significant product of the present invention.

Another aspect of the invention is that we flocculate proteins following their precipitation, which allows the use of continuous decanters with lower g force instead of high speed centrifuges. Lower g force prevents excessive foaming that makes subsequent protein separation prohibitive. Furthermore, to facilitate lipid separation from the protein solution following protein solubilization, emulsion breakers may be used to allow lower g forces, and prevent excessive foaming.

The bio-reactors have specially designed mixing baffles and vessel shape to prevent pH gradient and prevent excessive foaming. The bio-reactor vessels and the mixing baffles are manufactured by Sartorius BBI Systems of Bethlehem, Pa.

The pH at which the proteins are solubilized in the present invention makes the proteins soluble and significantly reduces solution viscosity. The reduced viscosity facilitates subsequent continuous decanting.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIG. 12 is a table demonstrating texture properties of trout gels developed from the recovered proteins and Alaska Pollack surimi gels.

FIG. 13 is a table which demonstrates color properties of trout gels developed from the recovered proteins an Alaska Pollack surimi gels.

FIG. 14 is a table demonstrating that muscle proteins recovered from krill and trout processing byproducts using isoelectric solubilization/precipitation according to the present invention have very low ash content FIG. 15 is a table demonstrating the essential amino acids found in trout and krill proteins.

Similar reference characters denote corresponding features consistently throughout the attached drawings.

DETAILED DESCRIPTION OF PREFERRED EMBODIMENTS

The present invention shall be described herein by way of fish, and specifically trout, as an example. The procedures and products incorporated herein are effective with alternative sources of lipids and proteins, including fish and non-fish byproducts. Fish byproducts are considered most desirable because of the healthy benefits of fish oils. Limited health risks result from either human or other animal consumption of rendered fish. Rendered meat products, on the other hand, may pose elevated health risks to human and animal consumers, and further down the food chain.

Figure 1:
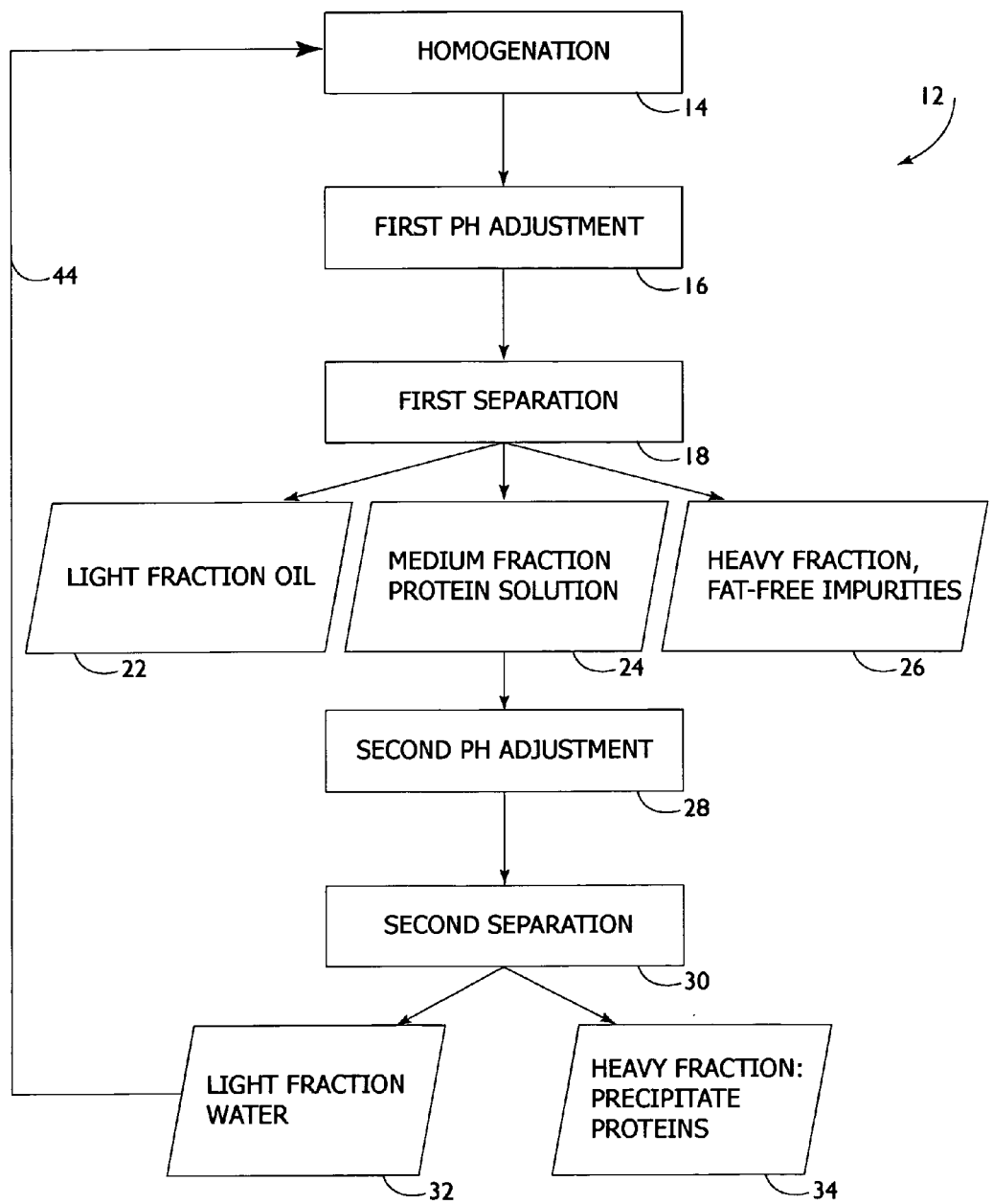
FIG. 1 is a flow chart showing a process of protein and lipid recovery from animal byproduct material according to the present invention.
Figure 2:
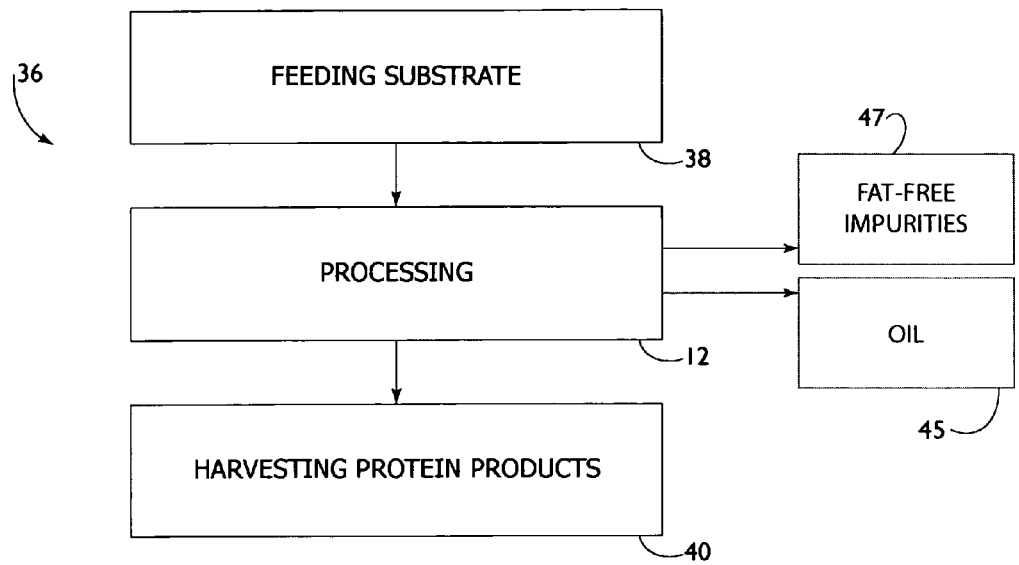
FIG. 2 is a flow chart showing an example of a batch operation according to the present invention
Figure 3:
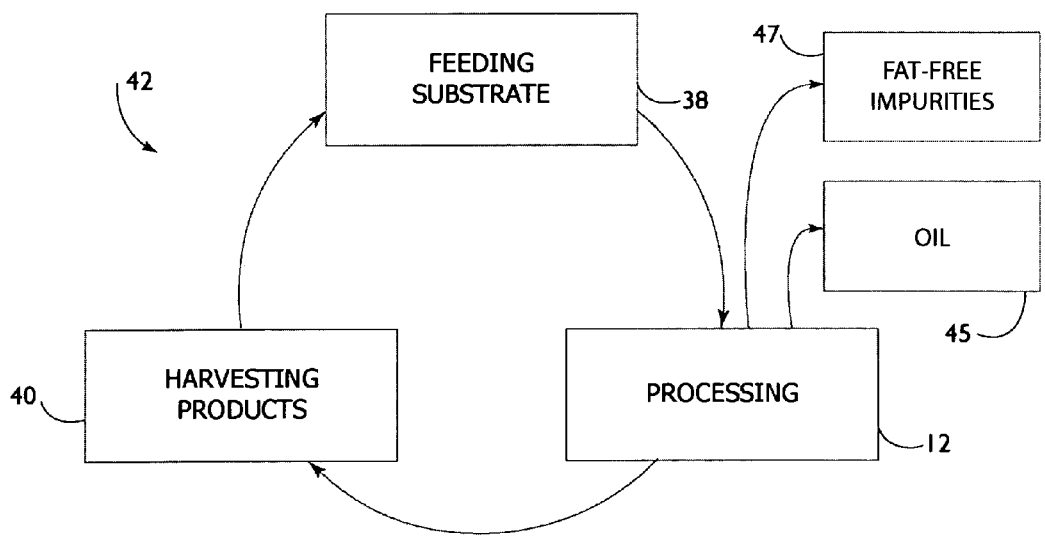
FIG. 3 is a flow chart showing an example of a continuous operation according to the present invention.

FIG. 1 is a flow chart which demonstrates a process 12 of protein and lipid recovery from animal byproduct material according to the present invention. FIG. 1 shows the protein and recovery system using isoelectric solubilization/precipitation. FIGS. 2 and 3 show block diagrams of batch 36 and continuous 42 production paradigms according to the present invention. The following five steps are used to recover muscle protein and lipids according to the process 12. The first step involves homogenization 14 to simplify sample handling and increase surface area of proteins and lipids, and therefore, to facilitate integration between proteins and lipids with water.

The second step involves a first pH adjustment 16 that results in protein solubilization. The protein solubilization is due to increased electrostatic interaction between proteins and water, and facilitates separation of lipids from water due to the increased polarity of the solution. The proteins are solubilized at either acidic (about 2.0 to about 3.5) or basic (about 10.5 to about 13.0) pH, followed by removal of insoluble materials.

The third step involves the first separation 18 by centrifugation which results in three fractions. The top fraction, which is the light fraction 22, contains fish lipids rich in omega-3 fatty acids, as confirmed by experimentation. The middle fraction 24 contains muscle proteins solubilized in water. The bottom fraction, which is the heavy fraction 26, contains the fat-free impurities, such as, bones, skin, fins, and other insoluble products.

In the fourth step, the middle fraction is recovered and subjected to a second pH adjustment 28. This results in isoelectric precipitation of muscle proteins due to decreased electrostatic interaction between proteins and water, and in increased hydrophobic interaction between proteins. The second pH adjustment involves a pH of about 5.0 to about 6.0. Protein precipitation in this step occurs at the proteins' isoelectric point (about pH 5.5), followed by their separation from water in the fifth step.

The fifth step involves a second separation 30. The second separation 30 by centrifugation results in separation of precipitated functional muscle proteins from water forming two layers: a light fraction 32 containing water and a heavy fraction 34 containing precipitated proteins. The water separated in this step is substantially protein-free and clear and can, therefore, be recycled 44 in the continuous process. The resultant products are packaged for sale or further processed in the conventional manner.

Products that may be developed from the protein products 40 include using the protein products 40 in the surimi industry. The surimi is typically purified fish meat (i.e., proteins) with added cryoprotectants, such as sorbitol and sucrose) sold in 20 pound frozen blocks. Furthermore, the recovered proteins could be used as a main ingredient in fish burgers, hot-dogs, sticks, chips, spreads, sausages, and other value-added foods. The recovered proteins could be used as food additives, as well. Also, non-food applications for the recovered proteins exist. For example, non-biodegradable hydrocarbon-based super absorbent gels (SAG) are used in diapers and other non-food applications to retain moisture.

The fat-free impurities 47 from the heavy fraction derived from fish by-products may be used for animal feed. The fat-free impurities 47 contains several minerals, such as Ca, Mg, P, and the like, that are important for animal growth. The fat-free impurities 47 may be used for feed additive in feed mills, and especially in the fish meal industry and pet food industry. Furthermore, the fat-free impurities 47 may be as plant fertilizers.

Regarding the lipids or oil 45 products, fish lipids or oil is a well established national and international commodity market. The fish oils are very rich in omega-3 fatty acids that allow FDA-approved claim of reducing the risk of cardiovascular disease; therefore, using the fish oil as an ingredient in foods allows this claim on packages, giving the products marketing advantages. The oil 45 recovered from the present invention may be considered crude oil ready for further refining. Following refining, the fish oil can be used in various applications including margarine, dietary supplements, and functional foods. Functional foods are defined as foods that resemble typical foods, but with human health benefits exceeding those from typical foods. In typical applications, the same active ingredients found in dietary supplements are added to typical foods making them functional foods. Staple examples are milk fortified with vitamins A and D or orange juice enriched with Calcium. Stable fish oils are commonly added in formulations of bread, ice cream, eggs, and many other foods. Non-food applications also exist. Animal oils, including fish oils, are commonly used in chemical industries for various products such as paints, solvents, and the like.

The continuous system 44 for protein and lipid recovery utilizes a byproduct homogenizer (step one), two bio-reactors (steps two and four), and two continuous centrifuges (steps three and five). A continuous meat homogenizer is used in step one to reduce particle size of the byproducts. Particle sizes of about 1 mm and below are desirable. This particle size results in a surface area that is great enough to result in efficient protein solubilization with the first pH adjustment 16 in step two as well as particle size large enough to allow efficient separation in the first separation 18 step three.

Figure 4:
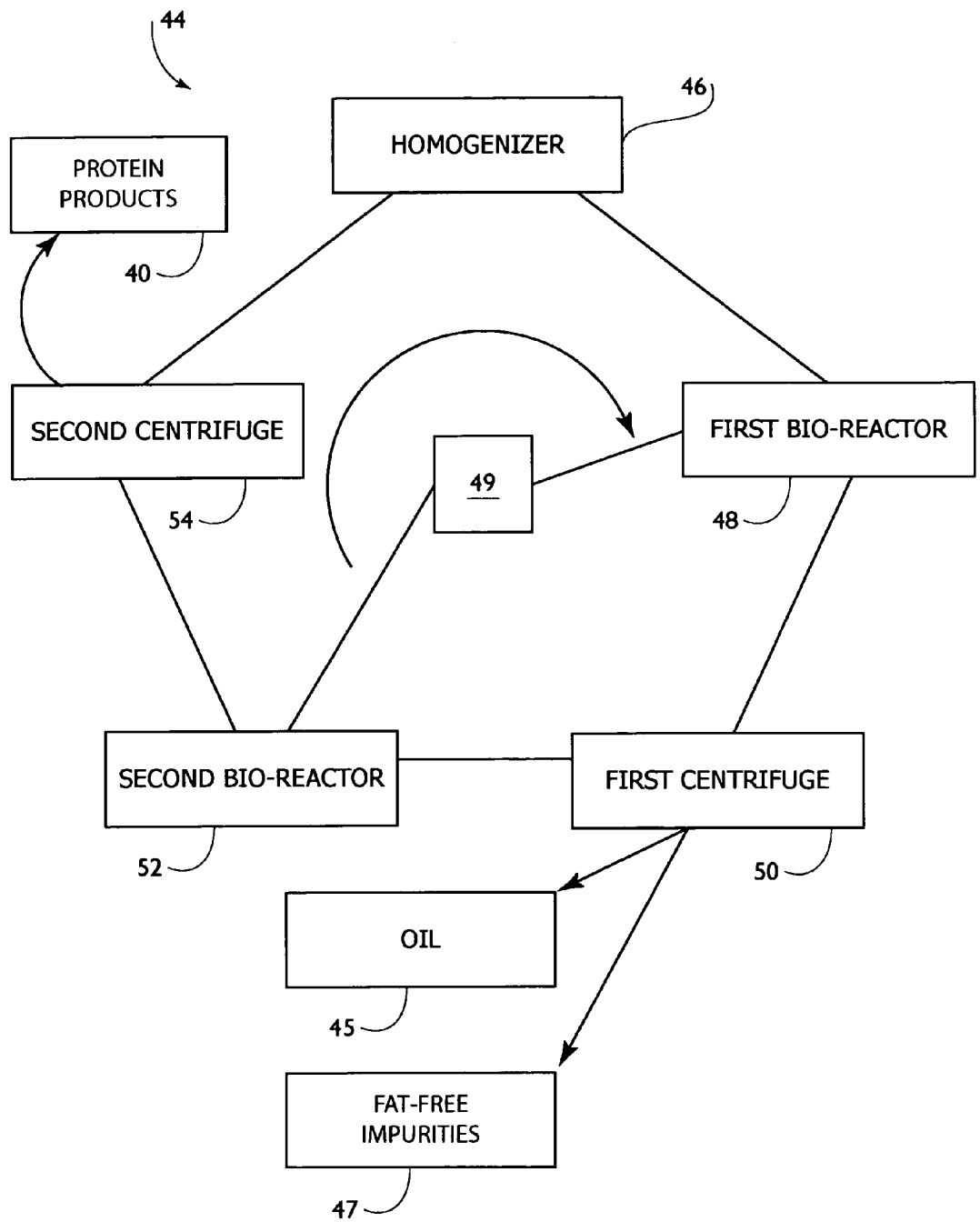
FIG. 4 is a diagram depicting an example of a system set up to carry out a continuous operation according to the present invention.

The set up used in performing the experiments from which the results are indicated in the graphs herein involve the following equipment. FIG. 4 represents a flow chart depicting the setup used. The equipment used to carry out the present invention is conventional. A few modifications, as described herein, may be made to optimize performance. In the homogenization 14, step one, a continuous homogenizer 46 (model: MCH 10, Stephan Machinery, Columbus, Ohio) was used. This homogenizer 46 was used to reduce particle size to below 0.2 mm. The continuous homogenizer 46 was modified to recirculate the liquid before it is discharged to a first bio-reactor for step one.

The second step, which is the first pH adjustment 16 that results in protein solubilization, is carried out in a bio-reactor which is in fluid communication with the homogenizer. In the experimental processes, the bio-reactor is a bio-reactor 1-45 liter vessel, model designated Biostat I Twin Controller, manufactured by Sartorius BBI Systems in Bethlehem, Pa. The muscle proteins may be solubilized at a pH of 11.0 for 10 min. The pH is set and controlled by the bio-reactor's control mechanism. About 10 N NaOH (10 normal sodium hydroxide, EMD Chemicals, Gibbstown, N.J.) may be used for pH adjustment. Optionally, an emulsion breaker may be added to significantly enhance separation of protein solution from lipids.

The third step is the first separation 18. A decanter centrifuge, which is in fluid communication with the first bio-reactor 48, may be used to carryout the third step. The decanter centrifuge, model P660 available from Alfa Laval, Seattle, Wash. was used. The decanter centrifuge separates insolubles from protein solution and lipids. A modified decanter, model Foodec 100 available from Alfa Laval, Seattle, Wash., with different inlet and shape of the separating bowl that allow gradual acceleration of the solution, and thereby, significantly reduce foaming. If emulsion breakers (step two modification) facilitate separation of lipids from protein solution, the decanter may be working in conjunction with a fast-speed centrifuge, such as, for example, model LAPX 404 available from Alfa Laval, Seattle, Wash., which will separate lipids (particularly the membrane lipids) from protein solution.

The fourth step is protein precipitation, and it is carried out in a second bio-reactor 52 which is in fluid communication with the first bio-reactor 48. In the experimentation, a bio-reactor 2-45 liter vessel model Biostat I Twin Controller available from Sartorius BBI Systems, Bethlehem, Pa. was used. The muscle proteins precipitate at a pH corresponding to the isoelectric point of the muscle proteins for 10 min. About 12 N HCl (12 normal hydrochloric acid available from VWR International, West Chester, Pa.) was used for pH adjustment. An optional modification is to inject of a flocculent such as A-150HMW available from Cytec Industries, West Paterson, N.J. which significantly enhances subsequent separation of precipitated proteins from water in step five.

Step five involves the second separation, and is carried out in the second centrifuge 54 which is in fluid communication with the second bio-reactor 52. The decanter centrifuge model P660 available from Alfa Laval, Seattle, Wash. was used. The second centrifuge 54 separates precipitated proteins from water. The water is then recycled into the homogenizer 46 for reuse in step one; therefore, the second centrifuge 54 is also in fluid communication with the homogenizer 46. A modified decanter model Foodec 100 (Alfa Laval, Seattle, Wash.) with different inlet and shape of the separating bowl is available, as discussed hereinbefore, that allows gradual acceleration of the solution, and thereby, significantly reduces foaming.

The described continuous system 44 works at an approximate flow rate of 4.5 liters/min. Processing capability is approximately 38 kg of input material (fish byproducts, krill, etc.) and the system separates muscle proteins, lipids, and insolubles (i.e., bone, skin, shell, etc.) with water recycling in a continuous mode. This processing capability should be considered a scaled down example only.

The first step in the isoelectric solubilization/precipitation is homogenization 14 (i.e., grinding) of the byproducts. Typically, a meat homogenizer such as for example Stephan Machinery MCH-10 (Stephan Machinery, Columbus, Ohio, United States) is used to create particles small enough for efficient solubilization in step two, yet sufficiently large for efficient separation in step three, which may be about 1 mm or below. Since the fillets are removed during filleting of whole fish, the bone, skin, scale, and other contents in the byproducts are higher than those in whole fish. When byproducts are used in the isoelectric solubilization/precipitation as a starting material, and they are finely ground up, it is useful to determine where these impurities end up. The ash content is a good indicator of these impurities. The amount of ash indicates the amount of impurities in the resultant product, as discussed hereinafter.

Following homogenization 14, the homogenate is pumped to the first bio-reactor for about ten (10) minutes solubilization reaction. The bio-reactor is equipped with a pH probe that continuously monitors the pH of solution in the vessel and feeds this pH to the control box. The control box is programmable and allows setting a pH value, which will be maintained in the vessel. The incoming homogenate has a pH that is close to neutral (approximately 6.6-7.0). The bio-reactor is programmed to maintain the vessel at a specific pH, such as 11.00. When the initial neutral homogenate is pumped into and fills the bio-reactor, equilibrium (homeostasis) is established, and thereafter, the bio-reactor works continuously. The bio-reactors in the continuous protein and lipid recovery system are also equipped with mixing baffles that allow gentle mixing to prevent pH gradient and excessive air intake that could cause prohibitive foaming. Temperature in the vessel is controlled in a similar fashion as the pH, where the temperature probe can trigger flow of refrigerant to maintain programmed temperature. Not only are the small built-in pumps used for acid/base flow, but they also allow control of foam formation by injection of proper food-grade antifoam agents (by mechanism similar to the pH and temperature control) as well as breaking the emulsion. The emulsion breaking can result in greater removal of fish oil, particularly persistent fish membrane lipids, from the solution following step two. The bio-reactors are connected to pumps that control flow rate through the system. The recovery system can work at 300 L/hr, resulting in processing capability of about 43 kg of starting material per hour.

The bio-reactor in step two may work in rather extreme pH (either acidic or basic), the bio-reactor is step four works under relatively mild conditions (about pH 5.5). Special precautions should be taken around the bio-reactor used in step two. Following 10-min pH adjustment in step two, the solution is pumped to a decanter for separation. The industrial decanters typically offer g force below 4,000×g. While the decanter in step three works under extreme pH conditions, the decanter in step five works under rather mild pH conditions (pH=5.5). If the recovery system works in a continuous mode, the flow rates of all the steps should match. Therefore, if the discharge from the bio-reactors is 300 L/hr, the decanters should be capable of handling the same flow rate. Otherwise, overflowing results and the personnel will be exposed to acid/base hazard. Decanters of various sizes are commercially available from several manufacturers.

The bio-reactors 48 and 52 are capable of continuous and automatic pH adjustment, proper mixing, temperature control, continuous pumping in and out, as well as precise dosing of food-grade additives such as emulsion breakers, protein flocculants, and antifoam agents. A control box 49 is placed between the bio-reactors 48 and 52. Following step two, lipids, protein solution, and fat-free impurities are separated in a decanter before the protein solution is pumped to the bio-reactor for precipitation in step four. A continuous mode of flow rate at 300 L/hr have been obtained.

When proteins start interacting with water in step two and four, a drastic increase of viscosity occurs. The viscosity drops as soon as the proteins become water soluble. However, this viscosity increase is an important processing parameter that may result in mixing issues (i.e., pH and protein solubility gradient), foam formation, and the like. Unless the solution is maintained at a desired pH continuously as for example in a continuous protein and lipid recovery system these undesirable operational difficulties may arise. Application of bio-reactors capable of continuous processing including maintaining pH at a level that prohibits viscosity fluctuations significantly reduces foaming issues.

The particle size of fish muscle proteins precipitated in step four can be efficiently increased by 10-min reaction with an-ionic flocculent of high molecular weight. Additional experimental results indicate that a high molecular weight an-ionic flocculent at 65 ppm resulted in excellent protein separation after 10 minutes reaction in the jar tester.

A specific example of an embodiment of the present invention involves starting materials such as fish frames and heads, which are byproducts of commercial fish filleting. Functional muscle proteins, lipids, and other materials are recovered from the staring material and formed into processed food products.

Step 1: Homogenization. The starting material is mixed with water at about 1:6 ratio (material:water, w/w) and the particle size is concurrently reduced to create particles small enough for efficient solubilization step two, yet, sufficiently large for efficient separation in step three, which may be below about 1 mm by continuous homogenizer. This particle size assures efficient reaction in subsequent steps and flowability of the material. The about 1:6 ratio assures proper flowability and separation of the material in the subsequent steps. Temperature of the material is controlled below about 8° C. to prevent adverse biochemical processes such as protein denaturation, proteolysis, and lipid oxidation.

Step 2: Solubilization. Acidic solubilization occurs between about pH 2.0 and about pH 3.5 and basic solubilization occurs between about pH 10.5 and about pH 13.0. The reaction time required for solubilization at either pH range is about 10 min. The muscle proteins interact with water resulting in protein solubility. This step is carried out in a continuous bio-reactor. The temperature is controlled below about 8° C. The mixing is adjusted to about 75 to about 150 rpm. A mixing baffle that minimizes air intake by the solution is used to prevent foaming.

For acidic solubilization (step 2, about pH 2.0-3.5) concentrated HCl is used. For basic solubilization (step 2, about pH 10.5-13.0) a concentrated NaOH, such as 10N NaOH, is used. To adjust pH to the isoelectric point at about pH 5.5 in step 4, either concentrated HCl or 10N NaOH for adjustment from basic or acidic solubilization, respectively, is used. The present invention is not limited to the specific acids/bases presented but any appropriate acid/base may be substituted herein for solubilization.

Step 3: Separation. Following about 10 min solubilization, the resulting solution is pumped to a continuous centrifuge for separation of the protein-lipid solution from insolubles (bones, skin, scale, collagen, stroma proteins, etc.) at about 12000-20000×g with a residence time of about 1 min 42 sec. The temperature is controlled below about 8° C. Vacuum at about 25 in. Hg is used in the centrifuge to prevent foaming and reduce heat of friction. The insolubles can be used for development of pet foods, animal feeds and plant fertilizers.

Step 4: Precipitation. Following the separation, the solution is pumped into bio-reactor for protein precipitation. Proteins are precipitated at their isoelectric point, which is pH 5.5. The temperature is controlled below about 8° C. The reaction time required for precipitation is about 10 min. The mixing is adjusted to about 75-150 rpm. A mixing baffle that minimizes air intake by slurry is used to prevent foaming. Protease inhibitors such as beef plasma protein (BPP) or the like is used at about 1% of protein weight (w/w) to prevent proteolysis.

Step 5: Separation. Following the precipitation, the solution is refrigerated at about 2-5° C. for about 24 hrs to allow protein-protein interactions, which increases separation efficiency. Following the 24-hr refrigeration, the solution with precipitated muscle proteins is pumped to a continuous centrifuge for separation of the functional muscle proteins from the lipid-water solution at about 12000-20000×g with a residence time of about 5 min. The temperature is controlled below about 8° C. Vacuum at about 25 in. Hg is used in the centrifuge to prevent foaming and reduce heat of friction. The fish lipids float to the top of the solution within about 4 hrs after centrifugation and are recovered by decanting. The remaining water is pumped back to step 1, homogenization; therefore, the water is recycled in the continuous system. Recovered lipids can be used as crude fish oil for further development of food ingredients, functional foods, dietary supplements or in other food or non-food applications. Separated proteins are a functional ingredient for the development of restructured value-added foods. These muscle proteins retain gel-forming ability, a critical protein functionality required in the gelled food products.

Temperature during all of the steps (steps 1-5) is controlled at about 2-8° C. This temperature range prevents heat-induced protein denaturation during protein recovery, reduces reaction rates of proteases, and minimizes lipid oxidation.

Figure 5:
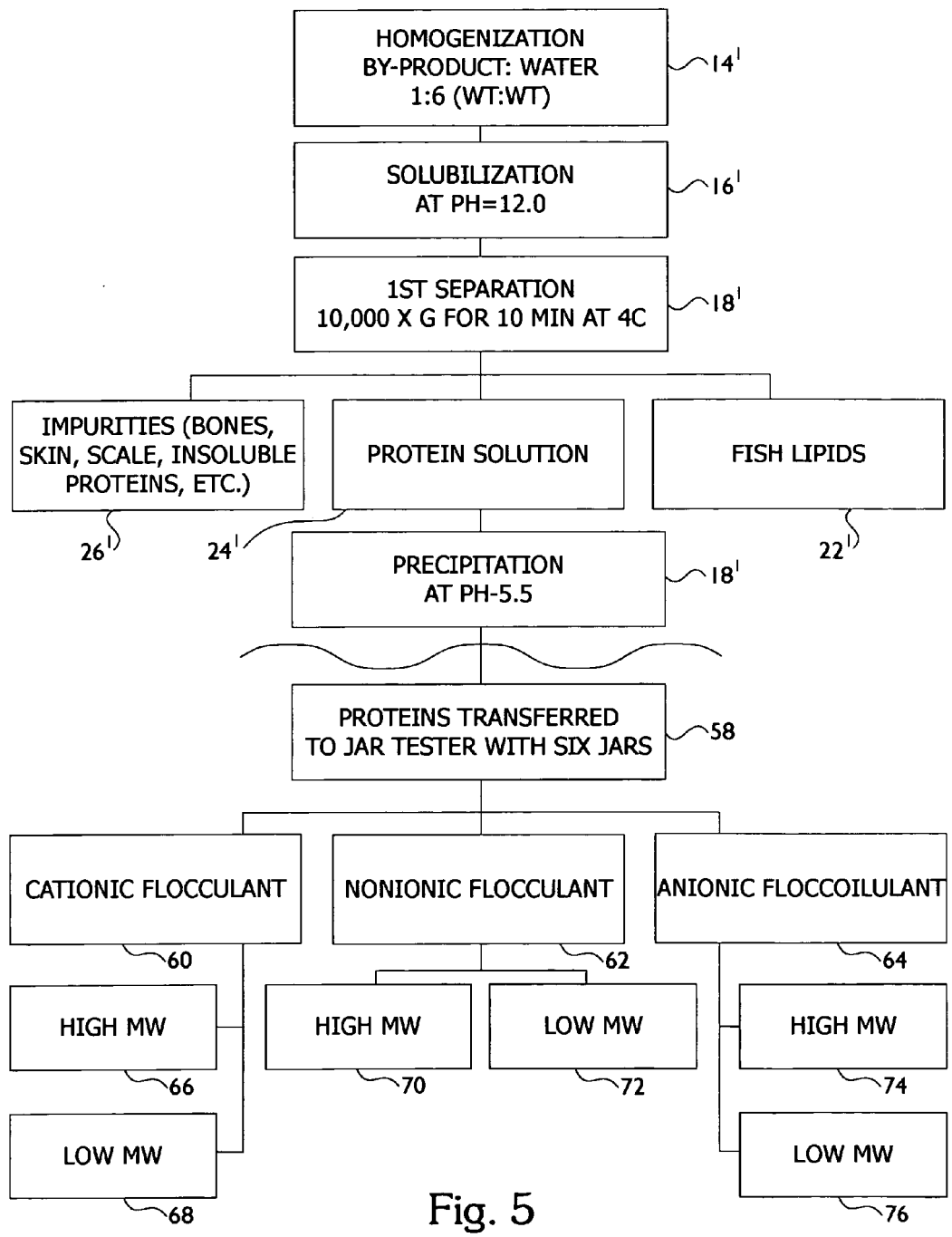
FIG. 5 is a flow chart showing as embodiment of the process of protein and lipid recovery from animal byproduct material, according to the present invention.

FIG. 5 is a flow chart which demonstrates an experiment 56 using cationic flocculent 60, nonionic flocculent 62 and anionic flocculent 64. The homogenization 14' step utilized a byproduct: to water ratio of 1:6 (wt:wt). The solubilization step 16' was carried out at an elevated pH of 12.0. The first separation 18' was carried out at 10,000 g for 10 minutes at 4° C. The impurities 26', including bone, skin, scale, insoluble proteins and the like, and the fish lipids 22' were removed. The protein solution 24' was subjected to the precipitation step 28' at pH 5.5, and then the proteins were transferred 58 into a jar tester with six jars: cationic flocculent 60 with one jar having high molecular weight 66 and one having low molecular weight 68, nonionic flocculent 62 with one jar having a high molecular weight 70 and the other a low molecular weigh 72, and anionic flocculent 64 with one jar having a high molecular weight 74 and the other having the low molecular weight 76. Two types (high and low molecular weight) of the three different (cat-, non-, and an-ionic) flocculents were used at six different concentrations in the jar tester.

In other words, two types (high and low molecular weight) of the three different (cat-, non-, and an-ionic) flocculants were used at six different concentrations in the jar tester. The solutions were gently stirred at 125 rpm for 10 minutes following flocculant injection to each jar. Supernatants from each jar at 10-minute intervals for 90 minutes were used to evaluate optical density with the Brandford dye-binding method at 595 nm. Triplicate measurements were performed. The fish muscle protein flocculation curves for each flocculant at different concentrations were plotted to evaluate protein flocculation rates.

Figure 6:
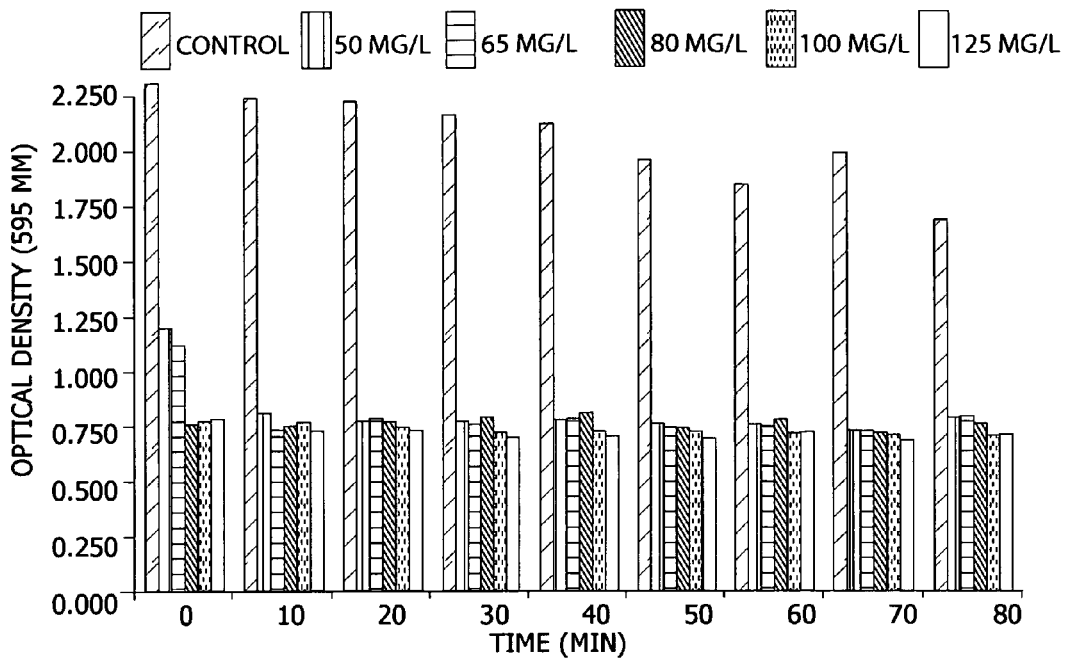
FIG. 6 is a graph plotting time versus optical density at 595 nm after flocculation of fish muscle proteins subjected to high molecular weight anionic flocculent and isolated by isoelectric solubilization/precipitation
Figure 7:
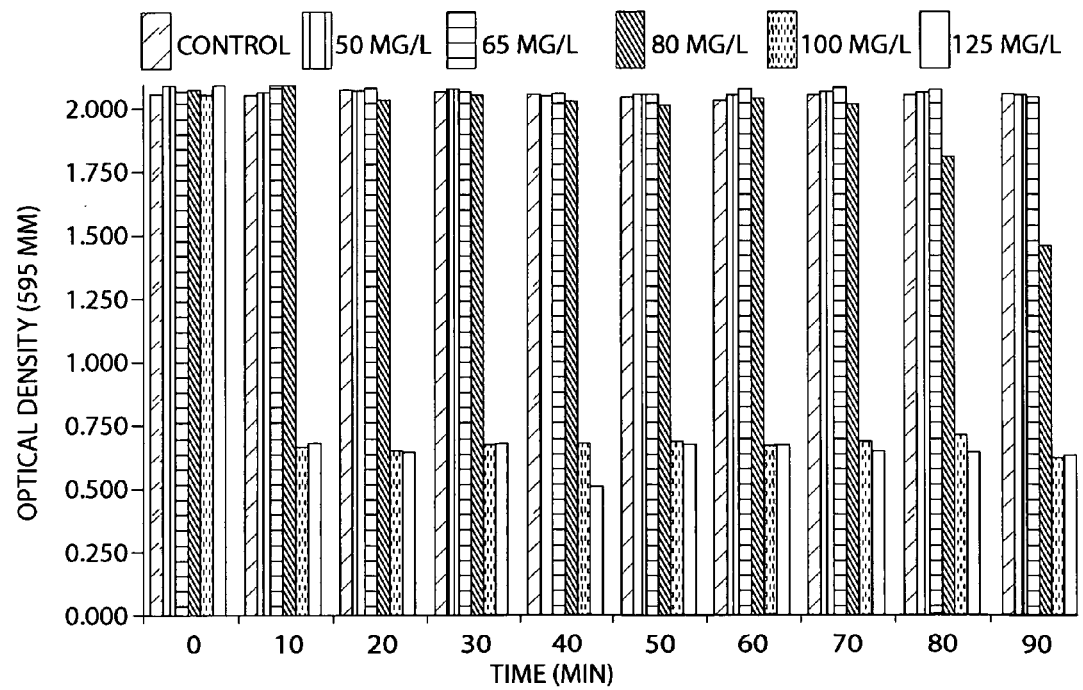
FIG. 7 is a graph plotting time versus optical density at 595 nm after flocculation of fish muscle proteins subjected to high molecular weight anionic flocculent and isolated by isoelectric solubilization/precipitation
Figure 8:
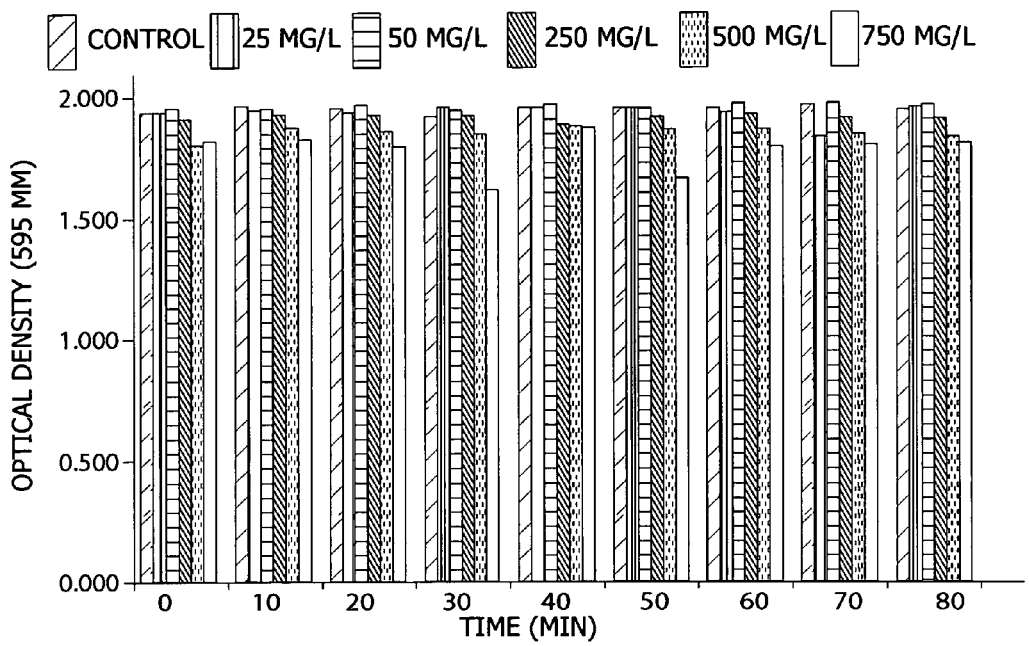
FIG. 8 is a graph plotting time versus optical density at 595 nm after proteins were subjected to low molecular weight anionic flocculent.

The solutions were gently stirred at 125 rpm for 10 minutes following flocculent injection to each jar. Supernatants from each jar at 10-minute intervals for 90 minutes were used to evaluate optical density with the Brandford dye-binding method at 595 nm Triplicate measurements were performed. Fish muscle protein flocculation curves for each flocculent at different concentrations were plotted to evaluate protein flocculation rates. These results are depicted in the three graphs: FIGS. 6, 7, and 8.

FIG. 6 shows a graph of optical density versus time for the flocculation of fish muscle proteins isolated by isoelectric solubilization/precipitation. Proteins were subjected to a high molecular weight anionic flocculent at concentrations 0-125 ppm and optical density of the supernatant was measured at 10-min intervals for 80 min at 595 nm. Therefore, subsequent separation in a decanter (step five) can be performed at higher flow rates. The flocculent can be injected into bio-reactor (step four). Optical density of the supernatant following the 10-min reaction is comparable to that of clear water. This indicates that water can be recycled in the homogenization 14 step one.

Similarly, FIG. 7 shows a graph of optical density versus time for flocculation of fish muscle proteins isolated by isoelectric solubilization/precipitation. Proteins were subjected to a high molecular weight anionic flocculant at concentrations from 0-150 ppm and optical density of the supernatant was measured at 10-min intervals for 90 minutes at 595 nm. These results demonstrate that a high Mw an-ionic flocculant at 65 ppm resulted in excellent protein separation after 10 min reaction in the jar tester. Also, that the optical density of the supernatant was comparable to that of clear water, and therefore, the effluent water from the decanter-centrifuge could be re-used in the homogenization step. This flocculent may be injected into the bio-reactor during the continuous adjustment of pH to 5.5, resulting in increased size of proteins, and therefore, more efficient separation during subsequent centrifugation in a decanter-centrifuge. Flocculants are commonly used in the treatment of drinking water and processing of various foods.

FIGS. 6 and 7 show protein separation following a 10-minute reaction with an-ionic flocculant of high molecular weight. The second pH adjustment (FIG. 1 step 4) typically requires 10 minutes in a continuous recovery system. This an-ionic flocculent can be injected into the second bio-reactor 52 to induce protein flocculation, and therefore, increase separation efficiency in the subsequent step second separation 30. This flocculent does not have an adverse effect on color or gelation properties of the recovered proteins. However, for commercial application proper approvals would need to be obtained from local authorities. FIG. 8 is a graph of optical density versus time for flocculation wherein the proteins were subjected to a low Mw anionic flocculent at concentrations from 0-750 ppm.

A high molecular weight an-ionic flocculent at 65 ppm resulted in excellent protein separation after 10 minute reaction in the jar tester. The optical density of the supernatant was comparable to that of clear water, and therefore, the effluent water from the decanter-centrifuge could be re-used in the homogenization step. This flocculant could be injected into the bio-reactor during the continuous adjustment of pH to 5.5, resulting in increased size of proteins, and therefore more efficient separation during subsequent centrifugation in a decanter-centrifuge. However, it will be necessary to determine the effects of this flocculant on the gelation properties of the recovered proteins as well as other quality attributes of final products. While flocculants are commonly used in the treatment of drinking water and processing of various foods, an USDA or FDA approval to use protein flocculants in fish processing for human consumption will be required.

From an economic stand-point fast protein recovery is important. Protein separation during step five is relatively slow due to small particle size of the muscle proteins that are first subjected to solubilization and subsequently precipitation. Therefore, relatively high g force and residence time in the second decanter may be allowed. The size of the protein particles can be increased by allowing protein-protein hydrophobic interactions to form over extended time (about 24 hrs), following the second pH adjustment to induce isoelectric precipitation of muscle proteins.

The temperature during step five, however, may be controlled at 1-8° C. in order to minimize protein denaturation. According to Stoke's law, the particle settling velocity under gravitational force (g) is dependent on the following four variables: (1) density differential between separated phases, (2) viscosity, (3) "g" force, and (4) the square of particle size. The only variable in the isoelectric solubilization/precipitation recovery system that can be modified is the particle size. For example, if the particle size is increased by a factor of three, the particle settling velocity will increase by nine. Not only can the protein particle size be increased by hydrophobic protein-protein interaction over 24 hrs, but also by addition of flocculants. Flocculants are commonly used in the food industry and in the treatment of drinking water for solution clarification purposes. There are many different flocculants commercially available. Such flocculents are well known.

Figure 9:
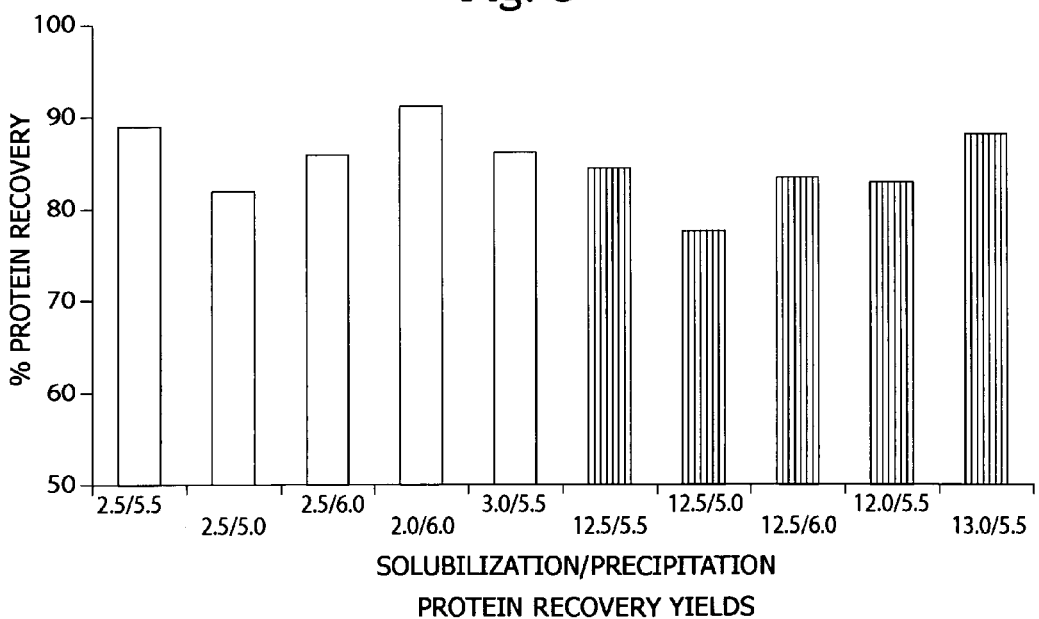
FIG. 9 is a graph demonstrating protein recovery yields.

The graph depicted in FIG. 9 demonstrates the protein recovery yields. The y-axis measures percent protein recovery and the x-axis measures solubilization/precipitation. The y-axis ranges from 50% at the x-axis to 100% at the top of the y-axis. The x-axis depicts the following solubilization/precipitation pH combinations starting from the right side: 2.5/5.5, 2.5/5.0, 2.5/6.0, 2.0/5.5, 3.0/5.5, 12.5/5.5, 12.5/5.0, 12.5/6.0, 12.0/5.5, and 13.0/5.5. FIG. 9 demonstrates that the protein recovery yield of the present invention is approximately 90% on dry weight basis.

Figure 10:
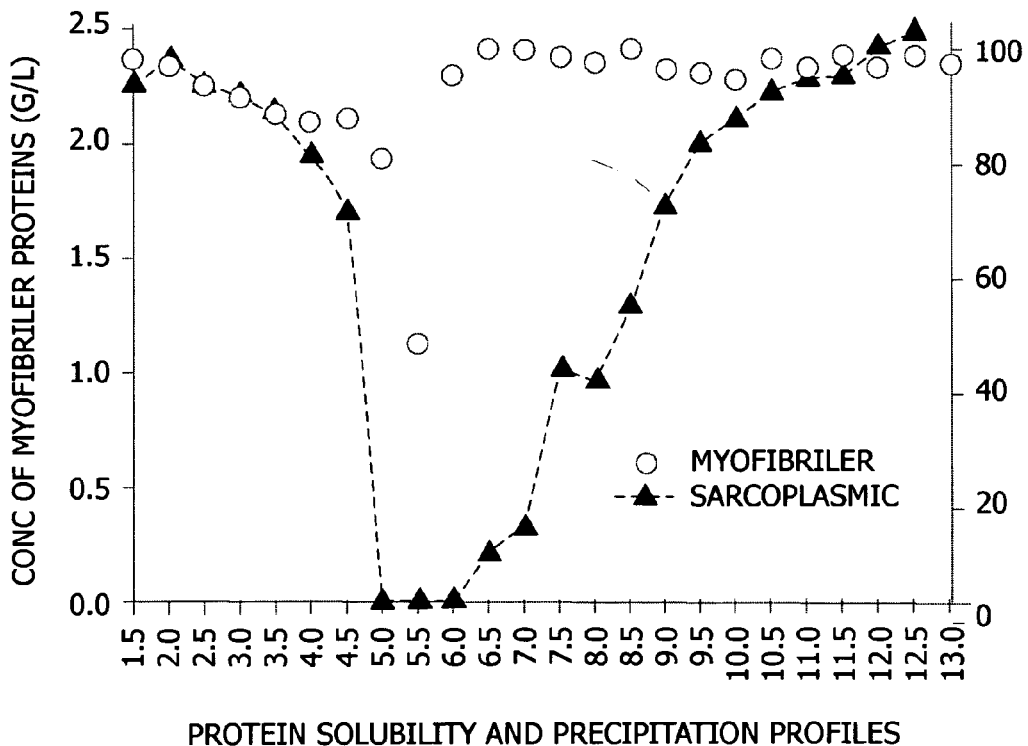
FIG. 10 is a graph demonstrating protein solubility indicating that proteins solubilize and precipitate in water as a function of pH.

The graph depicted in FIG. 10 demonstrates protein solubility and shows that proteins solubilize and precipitate in water as a function of pH. The y-axis on the left is concentration of myofibrillar proteins (g/L) in concentrations ranging from 0.0 at the x-axis to 2.5 at the top of the y-axis. The x-axis depicts pH from 1.5 to 13.0. the y-axis on the right represents percent solubility of sarcoplasmic proteins and ranges from 0% to 100%. The top, shallow curve represents sarcoplasmic whereas the bottom, deeper curve represents myofibrillar proteins. The recovery is based on isoelectric solubilization and precipitation of trout muscle proteins. The recovered trout muscle proteins retain their functionality and gelation. Gelation is critical in development of restructured value-added food products. Protein gels are also developed from recovered proteins. The laboratory-developed gels mimic restructured value-added foods and allowed determination of texture and color properties. Color and texture are two important quality attributes for these foods.

Figure 11:
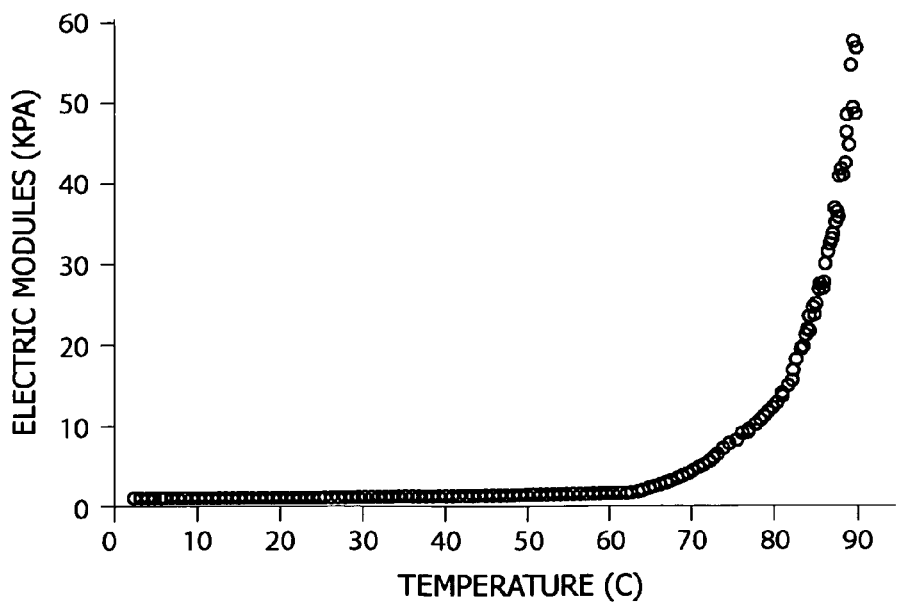
FIG. 11 is a graph demonstrating the gelation properties of the present invention.
Figure 16:
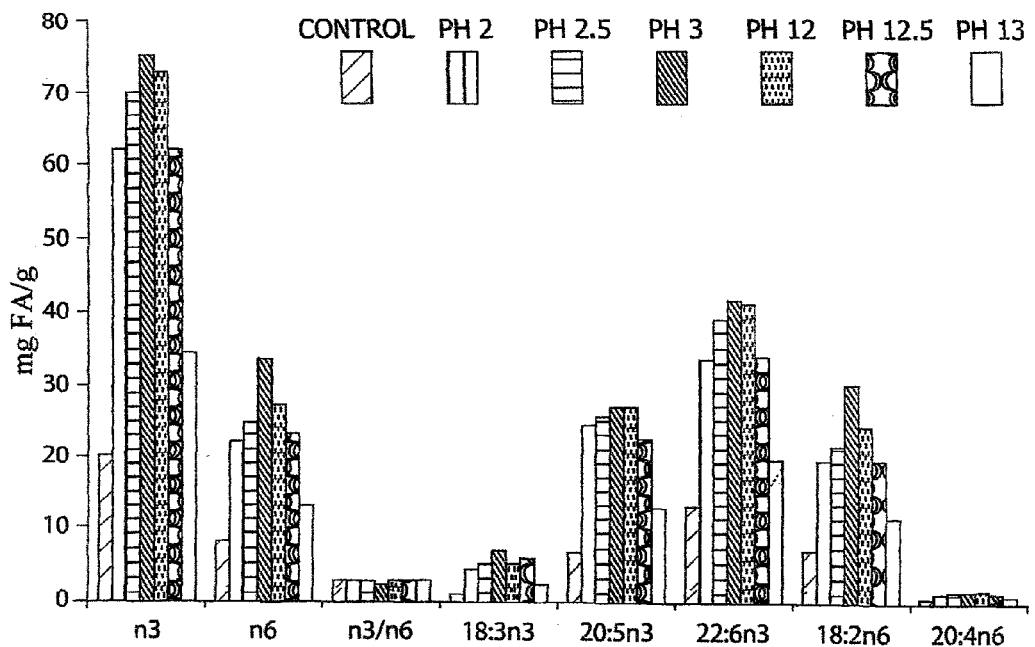
FIG. 16 is a graph demonstrating the quality of trout lipids and shows the good quality of recovered lipids that can be used as a crude oil to develop secondary food and non-food products.

The muscle proteins recovered from trout retain their functionality-gelation, which is critical in development of restructured value-added food products, as demonstrated by FIG. 11. Furthermore, the omega-3 fatty acids included in the recovered trout, do not exhibit degradation due to the Ph treatment during protein and lipid recovery, demonstrated by FIG. 16. The graph depicted in FIG. 11 demonstrates the protein gelation properties of the present invention. This graph shows that the recovered proteins retain their gel-forming ability, which is critical in the development of the restructured value-added foods (ex: "fish dog"). Similarly, FIG. 16 demonstrates the quality of trout lipids and shows the good quality of recovered lipids that can be used as a crude oil to develop secondary food and non-food products.

The laboratory-developed gels mimic restructured value-added foods and allow scientific determination of texture and color properties, which are the two most important quality attributes for these foods. The texture of the gels developed from trout proteins exhibited better firmness in comparison to gels developed from highest grade commercial Alaska Pollack surimi, as shown in FIG. 12. Although the L* values of the trout gels were comparable to those of Alaska Pollack surimi gels, suggesting similar color lightness; the b* value of the former was higher than that of the latter, suggesting lower whiteness, as shown in FIG. 13.

Protein gels may be developed from the recovered proteins. The laboratory-developed gels mimic restructured value-added foods and allow scientific determination of texture and color properties, which are the two most important quality attributes for these foods. The texture of the gels developed from trout proteins exhibited better firmness in comparison to gels developed from highest grade commercial Alaska pollack surimi, as shown in FIG. 12. Although the L* values of the trout gels were comparable to those of Alaska pollack surimi gels, suggesting similar color lightness; the b* value of the former was higher than that of the latter, suggesting lower whiteness, as shown in FIG. 13.

With reference to the table shown in FIG. 14, you can see that the muscle proteins recovered from krill and trout processing byproducts using isoelectric solubilization/precipitation have very low ash content, suggesting that the fat-free impurities separated in step three retain ash-yielding components such as bone, skin, scale, fins, etc. The % ash listed in both tables is on dry basis. FIG. 14 shows that the ash content (dry basis) of trout frames and whole krill is 13.91 and 17.36%, respectively. However, the ash content of boneless skinless trout fillets and krill tail meat is 5.54 and 11.09%, respectively. The isoelectric solubilization/precipitation results in the ash content at approximately 5 and 1.5% for krill and trout recovered proteins, respectively. Therefore, the recovered proteins using the isoelectric solubilization/precipitation likely contain much less impurities (bone, skin, scale, etc.) than the boneless skinless fillets and krill tail meat.

FIG. 14 also shows that the fat-free impurities recovered in step three as a heavy fraction contain 41.10% of ash. This fraction is likely very high in important minerals such as Ca, P, Mg, etc., and therefore, could be used in animal feeds and pet foods. Since the fish oil is removed from this fraction, unlike typical fishmeal, it should not impart a fishy (i.e., rancid) odor to the meat of animals fed this fraction.

With reference to the table shown in FIG. 15, essential amino acids, muscle proteins recovered from krill and trout processing byproducts using isoelectric solubilization/precipitation are rich in essential amino acids (EAA). The content of EAA from soy protein isolate along with the EAA pattern for high-quality protein that meets human requirements as established by the Food and Nutrition Board (FNB) Research Council are listed for comparison purposes ((Source: Adapted from Hui, Y. H. 1999. Soybean and soybean processing. In: Wiley Encyclopedia of Food Science and Technology (2nd ed.). Francis, F. J. (ed.). John Wiley and Sons. Hoboken (United States)). Abbreviations: Thr—threonine, Val—valine, Met—methionine, Ile—isoleucine, Leu—leucine, Phe—phenylalanine, His—histidine, Lys—lysine, Trp—tryptophan.

If the recovered proteins are to be used in human food products, knowing the nutritional value of these proteins will be essential. Humans are incapable of synthesizing nine amino acids (AA), and therefore, they have to be provided in the diet for proper development and functioning. This is why these nine AA are called essential AA (EAA). Table shown in FIG. 15 compares EAA content of krill and trout proteins recovered by using the isoelectric solubilization/precipitation. Table shown in FIG. 15 also lists the EAA content for de-fatted soybean protein isolate and the EAA pattern for high-quality protein that meets human requirements as established by the Food and Nutrition Board (FNB) Research Council. The proteins recovered from trout processing byproducts are highly nutritious and contain all of the EAA. Soybean proteins are a typical example of plant-derived proteins and while they are an excellent source of EAA, they seem lower in methionine than the FNB and also lysine is lower than animal-derived proteins. While trout frames and whole krill fall short in EAA when compared to the FNB pattern, these products are not used for direct human consumption without processing. The muscle proteins recovered from both trout byproducts (i.e., frames) and whole krill are an excellent source of EAA. Methionine and lysine are abundant in both proteins. The muscle proteins recovered from krill are of excellent quality and could provide very good nutrition if used in human food products.

Lysine concentration is also critical for certain non-food applications. The recovered proteins can be chemically modified to make bio-degradable super-absorbent hydrogel (SAH). About 1 g of such a SAH is capable of trapping 400 g of water or saline solution in a gel network. However, high concentration of lysine in a protein is essential. Currently, non-biodegradable hydrocarbon-based SAH are used in diapers, paper towels, and the like. Therefore, proteins recovered using our system could be used to develop the SAH for diapers and the like.

Figure 17:
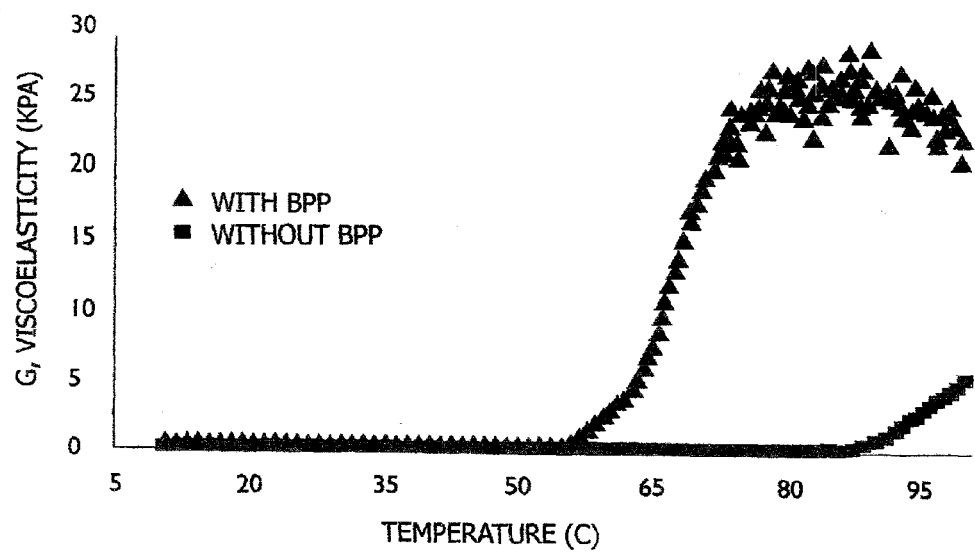
FIG. 17 is a graph plotting viscoelasticity versus temperature.

FIG. 17 shows the viscoelasticity versus temperature. Muscle proteins recovered from krill using the isoelectric solubilization/precipitation showed poor gel-forming ability most likely due to high activity of endogenous proteases. However, application of beef plasma protein (BPP) inhibited proteolytic activity, and therefore, resulted in gelation of muscle proteins recovered from krill. Protein gelation is a fundamental functionality of proteins used in meat product formulations. Proteolytic enzymes (proteases) cause proteolysis (i.e., proteins breakdown), which contributes to significant reduction of protein gelation.

Krill has extremely potent endogenous proteolytic enzymes, which significantly contributed to the impediment of a development of food products from krill. FIG. 17 shows viscoelastic modulus (G') of krill muscle proteins recovered using the isoelectric solubilization/precipitation. As the krill protein paste is subjected to slow heating ramp (1° C./min) in a dynamic rheometer, the proteins start gelling, which results in increased elasticity and decreased viscosity of the paste (increased G'). Beef plasma protein (BPP) has been used as a protease inhibitor in the surimi industry for surimi recovered from fish species prone to enzymatic proteolysis such as Pacific whiting. When krill protein paste was formulated without BPP and slowly heated in a dynamic rheometer, extensive proteolysis occurred up to 60° C. and the proteins failed to form a gel. However, when 1% BPP (wt/wt) was added to the krill protein paste and subjected to the same heat ramp in the dynamic rheometer, the recovered proteins gelled, as shown in FIG. 17. Therefore, it is likely that the krill proteases responsible for protein degradation are retained with the proteins during the isoelectric solubilization/precipitation similarly to cathepsin L in Pacific whiting during water washing in surimi making. There are several protease inhibitors commercially available besides BPP. This means that proteins recovered from krill using the isoelectric solubilization/precipitation system can be used in meat product formulations in combination with proper protease inhibitors or alternatively fast heating techniques such as industrial microwave or ohmic heating could be applied to krill proteins without the inhibitors.

Optional final products include protein gels from recovered proteins. The recovered proteins retain their gel-forming ability, and therefore, when subjected to heat the proteins form a gel network ("solidify"). In the lab, gels ("fish dogs") are made to scientifically determine textural and color properties of the proteins, which are directly related to the protein quality. This allows a comparison between different proteins, processes, ingredients, etc. (i.e., experimental variables). Ingredients are mixed in a chopper and then the resulting paste in stuffed in the tubes with standardized internal diameter of 19 mm to form the "fish dogs". This mimics a typical industrial process for making conventional "hot dogs". The ingredients added to the proteins may include, but are not limited to, salt (NaCl) at about 2% (w/w) to facilitate protein gelation, water or ice to adjust moisture of the final product to a desired level, BPP at about 1% (w/w) to prevent proteolysis during subsequent heating step, transglutaminase (TGase) at about 1% (w/w) to induce covalent bonds between proteins, potato starch at about 3% (w/w) to enhance gel strength. Following the mixing of the ingredients, the paste is stuffed into the tubes, which are held at refrigeration temperature (about 2-5° C.) for about 1 hr to allow formation of TGase-induced covalent bonds and then cooked at about 90° C. for about 15 min. Following removal of gels from the tubes and chilling of the gels ("fish dogs"), the protein properties can be instrumentally evaluated.

The lab gels do not contain any flavors or color additives; the sole purpose of the lab gels is determination of protein quality. If the protein quality is satisfactory, then other attributes such as flavors, shapes, colors, etc. may be added to meet market demand. For example, color additives to make fish dogs appear similar to pink hot dogs may be added. The recovered protein products can be used to develop numerous final food products. The gels (such as in the form of "fish dogs") need not be covered with a membrane.

The recovery process may be used to form tubes such as for fish dogs, sliced products (such as bologna), canned products (such as potted meat) or the like. Protein gelation ("solidification") is a series of bio-chemical phenomena that occur to food proteins. Whenever the proteins are subjected to heat they gel by forming a network between the proteins stabilized by certain bonds, which leads to a typical texture development. Typical examples of protein gelation are cooking an egg, grilling a hamburger, and deep-frying a boneless skinless chicken breast.

As explained hereinbefore, certain gelation aids are commonly used in the food industry. They are gel strength enhancers (e.g., starches), protein bond inducers (e.g., TGase), and proteolysis inhibitors (e.g., BPP). All of these aids are commonly used, accepted by consumers, and approved by proper authorities (USDA, FDA). BPP is well known and defines spray-dried beef plasma protein (available from Proliant Inc., Ankeny, Iowa), and TGase is also well known and defines exogenous transglutaminase (Activa®, Ajinomoto USA Inc., Teaneck, N.J.).

It is to be understood that the present invention is not limited to the embodiments described above, but encompasses any and all embodiments within the scope of the following claims.

What is claimed is:

1. A process for recovering protein and lipid from animal byproducts or krill comprising:
   a. homogenizing animal byproducts or krill with water to form a homogenate;
   b. solubilizing the homogenate by adjusting the pH of the homogenate to form a first pH adjusted composition; wherein, antifoam agents are added to the first pH adjusted composition;
   c. separating the first pH adjusted composition forming a light fraction containing lipids, a medium fraction containing protein in solution, and a heavy fraction containing fat-free impurities;
   d. adjusting the pH of the medium fraction to about the isoelectric point of the proteins thereby precipitating the medium fraction forming a second pH adjusted composition; wherein, antifoam agents are added to the second pH adjusted composition wherein the proteins have been precipitated; and
   e. separating the second pH adjusted composition forming a light fraction containing water and a heavy fraction containing precipitated proteins; wherein the byproducts include skin, bone, scales, fin, heads, frames, or viscera.

2. The process of claim 1, wherein:
   the homogenate contains about one part byproducts to about six part water.

3. The process of claim 2, wherein: separating the first and second pH adjusted composition involves first and second centrifugation occurring at from about 3000 to about 3500×g for about 1 to about 3 minutes.

4. The process of claim 2, wherein: krill is used.

5. The process of claim 1, wherein:
   the solubilizing of the homogenate occurs from about pH 10.5 to about pH 13 or from about pH 2 to about pH 3.5.

6. The process of claim 1, further comprising:
   g. recovering the lipids.

7. The process of claim 1, further comprising:
   h. forming a food product from the precipitated proteins.

8. The process of claim 1, wherein:
   the isoelectric point ranges from about pH 3.5 to about 7.5.

9. The process of claim 1, wherein:
   the process is carried out under controlled temperature conditions wherein the temperature is from about 0° C. to about 9° C.

10. The process of claim 1, wherein:
    emulsion breakers are added to the homogenate.

11. The process of claim 1, wherein:
    a flocculent may be added to the medium fraction.

12. The process of claim 1, wherein:
    separating the first and second pH adjusted compositions involves first and second centrifugation occurring at from about 8,000 to about 10,000×g for about 10 minutes.

13. The process of claim 1, wherein:
    krill is used.

14. A protein containing solid composition recovered from an animal, the protein containing solid composition being formed by the process of:
   a. homogenizing animal byproducts or krill with water to form a homogenate;
   b. solubilizing the homogenate by adjusting the pH of the homogenate to form a first pH adjusted composition; wherein, antifoam agents are added to the first pH adjusted composition;
   c. separating the first pH adjusted composition forming a light fraction containing lipids (oil), a medium fraction containing protein in solution, and a heavy fraction containing fat-free impurities;
   d. adjusting the pH of the medium fraction to about the isoelectric point of the proteins thereby precipitating the medium fraction forming a second pH adjusted composition; wherein, antifoam agents are added to the second pH adjusted composition wherein the proteins have been precipitated; and
   e. separating the second pH adjusted composition forming a light fraction containing water and a heavy fraction containing precipitated proteins; wherein the byproducts include skin, bone, scales, fin, heads, frames, or viscera.

15. The protein of claim 14, wherein:
the homogenate contains about one part byproducts to about six part water.

16. The process of claim 15, wherein: separating the first and second pH adjusted composition involves first and second centrifugation occurring at from about 3000 to about 3500×g for about 1 to about 3 minutes.

17. The process of claim 2, wherein: krill is used.

18. The protein of claim 14, wherein:
the solubilizing of the homogenate occurs from about pH 10.5 to about pH 13 or from about pH 2 to about pH 3.5.

19. The protein of claim 14, further comprising:
g. recovering the lipids.

20. The protein of claim 14, further comprising:
h. forming a food product from the precipitated proteins.

21. The protein of claim 14, wherein:
the isoelectric point ranges from about pH 3.5 to about 7.5.

22. The protein of claim 14, wherein:
the process is carried out under controlled temperature conditions wherein the temperature is from about 0° C. to about 9° C.

23. The protein of claim 14, wherein:
emulsion breakers are added to the homogenate.

24. The protein of claim 14, wherein:
a flocculent is added to the medium fraction.

25. The protein of claim 14, wherein:
separating the first and second pH adjusted compositions involves first and second centrifugation occurring at from about 8,000 to about 10,000×g for about 10 minutes.

26. The process of claim 14, wherein:
krill is used.

27. A process for recovering protein and lipid from animal byproducts or hill, consisting of the steps:
   a. homogenizing animal byproducts or krill with water to form a homogenate;
   b. solubilizing the homogenate by adjusting the pH of the homogenate to form a first pH adjusted composition;
   c. separating the first pH adjusted composition forming a light fraction containing lipids, a medium fraction containing protein in solution, and a heavy fraction containing fat-free impurities;
   d. adjusting the pH of the medium fraction to about the isoelectric point of the proteins thereby precipitating the medium fraction forming a second pH adjusted composition; and
   e. separating the second pH adjusted composition forming a light fraction containing water and a heavy fraction containing precipitated proteins;
      wherein the byproducts include skin, bone, scales, fin, heads, frames, or viscera.

28. The process of claim 27, further consisting of the step:
g. recovering the lipids.

29. The process of claim 28, wherein:
separating the first and second pH adjusted composition involves first and second centrifugation occurring at from about 3000 to about 3500×g for about 1 to about 3 minutes.

30. The process of claim 28, wherein:
krill is used.

31. The process of claim 27, further consisting of the step:
h. forming a food product from the precipitated proteins.

32. The process of claim 27, wherein:
the isoelectric point ranges from about pH 3.5 to about 7.5; the homogenate contains about one part byproducts to about six part water; the process is carried out under controlled temperature conditions wherein the temperature is from about 0° C. to about 9° C.; emulsion breakers are added to the homogenate; a flocculent is added to the medium fraction; antifoam agents are added to the first pH adjusted composition; antifoam agents are added to the second pH adjusted composition; separating the first and second pH adjusted compositions involves first and second centrifugation occurring at from about 8,000 to about 10,000×g for about 10 minutes; the solubilizing of the homogenate occurs from about pH 10.5 to about pH 13 or from about pH 2 to about pH 3.5; separating the first and second pH adjusted composition involves first and second centrifugation occurring at from about 3000 to about 3500×g for about 1 to about 3 minutes; or krill is used; or combinations thereof.

* * * * *